US008649016B2

(12) United States Patent
Marx et al.

(10) Patent No.: US 8,649,016 B2
(45) Date of Patent: Feb. 11, 2014

(54) SYSTEM FOR DIRECTLY MEASURING THE DEPTH OF A HIGH ASPECT RATIO ETCHED FEATURE ON A WAFER

(75) Inventors: David S. Marx, Newbury Park, CA (US); David L. Grant, Newbury Park, CA (US)

(73) Assignee: Rudolph Technologies, Inc., Flanders, NJ (US)

( * ) Notice: Subject to any disclaimer, the term of this patent is extended or adjusted under 35 U.S.C. 154(b) by 0 days.

(21) Appl. No.: 13/134,716

(22) Filed: Jun. 15, 2011

(65) Prior Publication Data

US 2011/0292375 A1    Dec. 1, 2011

Related U.S. Application Data

(63) Continuation-in-part of application No. 12/456,781, filed on Jun. 23, 2009, now abandoned.

(51) Int. Cl.
*G01N 21/55* (2006.01)
*G01B 9/02* (2006.01)

(52) U.S. Cl.
USPC .......................................... 356/445; 356/454

(58) Field of Classification Search
USPC ........................................................ 356/445
See application file for complete search history.

(56) References Cited

U.S. PATENT DOCUMENTS

| 6,806,105 B2 | 10/2004 | Johnson et al. |
| 6,822,745 B2 * | 11/2004 | De Groot et al. ............. 356/496 |
| 6,878,301 B2 | 4/2005 | Mundt |
| 2004/0112863 A1 * | 6/2004 | Chen et al. ...................... 216/67 |
| 2005/0191858 A1 * | 9/2005 | Fukunaga et al. ............ 438/691 |
| 2007/0148792 A1 * | 6/2007 | Marx et al. ...................... 438/14 |

* cited by examiner

*Primary Examiner* — Tara S Pajoohi Gomez
(74) *Attorney, Agent, or Firm* — Dicke, Billig & Czaja, PLLC

(57) ABSTRACT

A system (10) for directly measuring the depth of a high aspect ratio etched feature on a wafer (80) that includes an etched surface (82) and a non-etched surface (84). The system (10) utilizes an infrared reflectometer (12) that in a preferred embodiment includes a swept laser (14), a fiber circulator (16), a photodetector (22) and a combination collimator (18) and an objective lens (20). From the objective lens (20) a focused incident light (23) is produced that is applied to the non-etched surface (84) of the wafer (80). From the wafer (80) is produced a reflected light (25) that is processed through the reflectometer (12) and applied to an ADC (24) where a corresponding digital data signal (29) is produced. The digital data signal (29) is applied to a computer (30) that, in combination with software (32), measures the depth of the etched feature that is then viewed on a display (34).

33 Claims, 6 Drawing Sheets

SYSTEM FOR DIRECTLY MEASURING THE DEPTH OF A HIGH ASPECT RATIO ETCHED FEATURE ON A WAFER

This application is a Continuation-in-part (C.I.P) of application Ser. No. 12/456,781 filed Jun. 23, 2009 now abandoned.

TECHNICAL FIELD

The invention generally pertains to systems for measuring an etched feature on a wafer, and more particularly to a system that directly measures the depth of a high aspect ratio etched feature from the non-etched surface of a wafer.

BACKGROUND ART

In the field of electronics, one of the most sought after goals is miniaturization. Efforts to make electronics and electronic memory smaller continue to drive manufacturers. There are a variety of techniques and technologies that facilitate continued miniaturization. One technique that is growing in importance is the deep etching of wafers, and the volume of wafers that go through this process is increasing. As the lateral dimensions of the etched features on a wafer, including etched features, continue to decrease, the ability to control the etching process is becoming more difficult.

For companies that make wafers with narrow deep etches, if the aspect ratio, which is defined as the ratio of etched depth to etched width, is more than approximately 5:1, optical non-contact measurement techniques are typically not viable. The reason for this is because optical technologies are not able to receive information from the bottom of an etched feature when viewed from the top. For example, if the width of the etched feature (also referred to as a trench or a via) is smaller than the illumination spot size, then the etched opening itself restricts the amount of light that can illuminate the bottom. However, if the illuminating spot is made smaller by increasing the numerical aperture of the illuminating optics, then the angular spectrum of the illumination will contain light rays at angles to steep to illuminate the bottom of the etched feature. As a result, when the aspect ratio is large and the etched width is small, there is no way to direct a significant portion of the illuminating light on the bottom of the etched feature. Therefore, an engineer who is utilizing the process must take measurements from a scanning electron microscope. These measurements are typically costly, time consuming and most importantly, destructive.

One of the most important electronic devices is a semiconductor, and one of the primary elements of a semiconductor is a silicon on insulator (SOI) wafer. During the manufacturing of electronic devices on a semiconductor wafer, some wafers go through a process known as thinning. There are a variety of reasons why a wafer must be thinned, but the most common are: to dissipate heat quickly, to expose interconnect layers, and to produce the silicon on insulator (SOI) wafer. SOI wafers are comprised of a thin layer of silicon on top of a thin layer of insulator, and these layers are supported by a full thick silicon wafer. Currently, approximately 5% of all semiconductor wafers manufactured are SOI wafers, but this percentage will continue to increase in the fixture.

The most widely used methods for thinning a wafer are back grinding and polishing. These methods operate on the lower surface, i.e. the non-etched surface, of the wafer. Wafer manufacturers must grind or polish the lower surface of the wafer to the desired thickness with high uniformity. If the wafer is lapped too thin, it might lack the required structural integrity or the interconnects will be overexposed. Even so, the industry trend is directed toward the manufacturing of consistently thinner wafers.

Another important aspect of semiconductor manufacturing is the measurement of wafer thickness. Present technology for measuring wafer thickness includes capacitive sensors, which measure the capacitance of a wafer, and height sensor techniques that utilize two sensors, with one sensor above the wafer and one sensor below the wafer. The use of capacitive sensors typically requires an in-depth knowledge of the wafer material and can generally only function correctly with a single wafer material, not wafers composed of multiple layers of different materials, such as SOI wafers, wafers supported by carriers or handle wafers. Additionally, capacitive sensors have a lower thickness limit of approximately 200 microns and are limited to a small sample of materials.

Height sensor techniques can generally function on thinner samples, and can accommodate multiple layer wafer stacks that are made of virtually any material as they detect the physical surface of a wafer. Height sensor techniques do require delicate alignment in all three axes and require calibration to "teach" the sensor how far apart the axes are in space. This calibration requirement is the lower accuracy limit of the measurements taken.

Present and developing technology for the connection of electronic chips of various functions includes a process known as Through Silicon Vias (TSVs). A TSV is essentially a small cavity in a silicon wafer, with a typical diameter of 1 to 100 microns and a typical depth of 25 to 500 microns. These etched features, as well as others such as trenches, are known as High Aspect Ratio features because their depth is significantly greater than their width. The TSVs are typically filled with a conductive material and then the electronic chips are built on top of the TSVs. When the chips are complete, the wafer is polished, or thinned, from the lower surface until the TSVs are exposed. The TSVs then facilitate the connections that are made to other chips or devices.

During the wafer manufacturing process, the depth of the TSVs is a critical element. If the TSVs are not deep enough, the wafer will not maintain the physical integrity that is required to continue the process when the TSVs are exposed. If the TSVs are too deep, they will be exposed before the wafer is thin enough. A manufacturing process engineer has no means of quickly, accurately and non-destructively measuring the thickness of a wafer during the manufacturing process. Currently, a wafer is thinned until visual inspection confirms the TSVs are exposed, without possessing accurate knowledge of the thickness of the wafer.

There are a variety of requirements for measuring the depth of an etched feature on a wafer. The high aspect ratio etched features are difficult to measure when using optical techniques because light can not propagate to the bottom of an etched feature and then return. This applies to both confocal techniques as well as interferometric techniques. Optical techniques are limited to an aspect ratio of 2 or 3 to 1. For etched features with a higher aspect ratio, the only current method to directly measure the depth is by destructively sectioning the wafer and then viewing the etched feature from the side. This method is undesirable because the wafer sample is destroyed and the electron microscope that must be utilized is expensive and time consuming.

Another wafer thinning process occurs for Silicon On Insulator (501) applications. SOI is essentially a wafer stack that comprises the fusing of two wafers with a thin oxide layer between the two wafers. The first wafer, which is known as the device wafer, is then polished to a specific thickness. The second wafer, which is known as the handle wafer, is sacrificial and is used simply to maintain the structural integrity of the device wafer.

Current technology only measures the entire wafer stack and can not differentiate between the two wafers. Therefore, a process engineer must measure the first/handle wafer, measure the oxide layer and then subtract these measurements in order to calculate the thickness of the second/device layer. The sensor utilized in the instant invention can differentiate between the two wafers and can measure the first/device layer directly, thereby reducing the error budget and improving accuracy.

A search of the prior art did not disclose literature or patents that read directly on the claims of the instant invention. However, the following U.S. patents are considered related.

| PAT. NO. | INVENTOR | ISSUED |
| --- | --- | --- |
| US2007/0148792(Pub) | Marx, et al | 28 Jun. 2007 |
| 6,878,301 | Mundt | 12 Apr. 2005 |
| 6,822,745 | DeGrout, et al | 23 Nov. 2004 |
| 6,806,105 | Johnson, et al | 19 Oct. 2004 |

The US2007/0148792 Publication discloses a system for measuring wafer thickness, flatness and the depth of etched features thereon. The system utilizes the non-etched surface of the wafer to accurately measure the lower surface of an etched feature, rendering the etched feature an effective bump that can be measured on the etched surface and non-etched surface by using a non-contact optical instrument. The system discloses the use of distance measuring sensors such as a chromatic confocal sensor to measure the trench, as a bump. The system utilizes a light source that renders the material of which the wafer is composed transparent. The light source functions in the near infrared region for measuring the thickness and trench depth of wafers made of silicon, which is opaque in the visible region and transparent in the rear infrared region. The difference between the referenced publication and the instant application is that the referenced publication uses distance measuring sensors, whereas the instant application uses a reflectometer.

The U.S. Pat. No. 6,878,301 discloses a method and an apparatus for optically detecting a trench's depth by detecting a first maxima in an intensity of multi-wavelength light. A portion of the multi-wavelength light is reflected from the trench's top surface. A second maxima in an intensity of multi-wavelength light is also detected. A portion of the multi-wavelength light is reflected from the trench's bottom surface. A maxima peak separation between the first maxima and the second maxima is determined which corresponds to the maxima peak separation. The apparatus is essentially a Michelson interferometer, and as such, requires a reference mirror. Additionally, the method disclosed illuminates the wafer on the etched surface.

The U.S. Pat. No. 6,822,745 discloses a method for determining a geometric property of a test object. The method includes interferometrically profiling a first surface of the test object in a first coordinate system; interferometrically profiling a second surface of the test object in a second coordinate system that is different from the first coordinate system; and providing a relationship between the first and second coordinate system. The geometric property is calculated based on the interferometrically profiled surfaces and the relationship between the first and second coordinate system.

The U.S. Pat. No. 6,806,105 discloses a method for measuring a parameter associated with a portion of a sample. The sample has formed thereon one or more structures with at least two zones each having an associated zone reflectance property. The method includes illuminating the zones with broadband light, and measuring at least one reflectance property of light reflected from the two zones. The method includes fitting a parametric model to the measured reflectance property. The parametric model mixes the reflectance properties of the zones to account for partially coherent light interactions between the two zones.

PUBLICATION

C. A. Duran, et al., "Infrared Reflectometery for Metrology of Trenches in Power Devices," 2007 IEEE/SEMI Advanced Semiconductor Manufacturing Conference p. 175.

Duran discloses a method of measuring the characteristics, including depth, of etched trenches in silicon. The method uses an illumination spot many times larger than the width of the etched trenches. The method illuminates the trenches using infrared light with wavelengths in the range from 1.4 microns to 20 microns. The illumination is on the etched side of the wafer. The reflected intensity is measured at different wavelengths and angles and compared to predicted measurements calculated with the rigorous coupled wave analysis (RCWA) method. The measurement results are the trench parameters used in the calculation that produce predicted measurements most similar to the actual measurements. Because the method relies on RCWA, the method is only valid for periodic structures of trenches, since it only measures the average characteristics for all of the trenches; it cannot measure the characteristics of an individual trench, nor of a single isolated trench. Furthermore, the publication describes trenches with an aspect ratio of approximately 2:1, and since the illumination is on the side of the etched surface, it will fail to illuminate the bottom of a trench with higher aspect ratio. Additionally, the method uses an illumination spot many times larger than the width of the etched trenches.

DISCLOSURE OF THE INVENTION

The invention discloses a simple, accurate and reliable system for directly measuring the depth of a high aspect ratio etched feature, such as a trench, which is located on a wafer. In its basic design configuration, the system uses an infrared reflectometer with a small spot size that is aligned to illuminate an etched feature from the non-etched surface of the wafer.

While the principles of reflectometry, and the use of reflectometers for measuring the thickness of layers are well known, the system utilizes a reflectometer for the direct measurement of the depth of a high aspect ratio etched feature, as well as the thickness of multiple layers of a wafer. Unlike Model-Based Infrared Reflectometry (MBIR), the system is a direct measurement of an individual etched feature, and unlike standard reflectometry, the system measures etched features with high spatial resolution.

An important aspect of the system is the measurement of etched features from the surface of the wafer opposite the etched surface. All of the prior art, including MBIR, illuminate and measures the etched features from the etched surface of the wafer.

Reflectometers measure the thickness of transparent layers of a wafer by measuring the wavelength dependence of the Farbry-Perot interference that occurs in the reflected or transmitted light. When a layer is illuminated with a spatially coherent beam of light, both the upper and lower surfaces cause a reflection. These reflections interfere with each other, and the reflected light amplitude can be large or small depending on whether the interference is constructive or destructive. The interference depends on layer thickness, its index of refraction, and the wavelength of the light. A "layer" is defined as any homogeneous medium with approximately parallel upper and lower surfaces. Examples are films deposited on a substrate, and the substrate itself, such as a silicon wafer.

The reflected intensity for a single layer cavity is:

$$R = \left| \frac{r_1 + r_2 e^{i2\delta}}{1 + r_1 r_2 e^{i2\delta}} \right|^2,$$

where $r_1$ is the reflection coefficient at the first surface of the cavity, $r_2$ is the reflection coefficient at the second surface, $\delta = 2\pi n l/\lambda$, n is the index of refraction, l is the cavity thickness, and $\lambda$ is the wavelength. Because of the complex exponential, the reflected intensity is periodic in $\delta$. Since $\delta$ is proportional to optical frequency (c/$\lambda$) the reflected intensity is periodic in optical frequency with period c/2 nl, where n is the index of refraction, l is the layer thickness, and c is the speed of light in a vacuum. The reflectometer incorporates a source that consists of many wavelengths or sweeps through many wavelengths in time. The reflected light must be analyzed for its dependence on wavelength. By determining the period of the reflected intensity with optical frequency, (optical frequency is inversely proportional to wavelength), the thickness of a wafer layer can be determined, if the index of refraction is also known. Reflectometers can be used to measure the thickness and index of a transparent layer. If the light source uses infrared wavelengths, and specifically wavelengths longer than 1.2 µm, then the thickness of a silicon wafer can be measured with a reflectometer.

When the cavity consists of multiple layers, the equation for the reflected intensity contains terms that combine the various combinations of thickness. The resulting reflected spectrum contains several periodicities, such as the period corresponding to the optical thickness of each individual layer, and the period corresponding to the total optical thickness.

To produce a sufficient interference signal, which is observed through the fringe visibility of the reflected signal, the reflections from the wafer's upper and lower surfaces must have similar beam divergences. For example, if the incident beam is collimated, then the reflected beams from the two surfaces will be collimated, and the interference will be strong and fringe visibility high. However, the present invention requires the incident beam to be focused so that only a small area is illuminated and the etched feature can be spatially distinguished. For substrates that are thicker than the depth of focus, the two reflections have different divergence angles, and so the fringe visibility is reduced. The depth of focus of a focused beam in a medium is approximately proportional to:

$$DOF = \frac{\lambda n}{2NA^2},$$

where $\lambda$ is the wavelength, n is the index of refraction of the medium, and NA is the numerical aperture of the focusing lens. Thus, the depth of focus increases with the index of refraction of the medium, which is approximately 3.6 for silicon. For example, if the numerical aperture is 0.1, and the wavelength 1.31 µm, then the depth of focus in silicon is approximately 468 µm. As a result, a silicon wafer can be as thick as 1000 µm and the fringe visibility would still be strong enough to provide a good signal.

The diameter of the focused spot relative to the diameter or width of the etched feature affects the quality and signal-to-noise ratio of the etch depth measurement. The diameter of the focused spot is approximately proportional to:

$$D = \lambda/NA$$

and is independent of the index of refraction of the substrate. If the measurement spot is smaller than the diameter or width of the etched feature, then the whole of the spot reflects off the bottom of the feature and contributes to the thickness measurement signal. When the diameter or width of the feature is similar to or less than the measurement spot diameter, only a portion of the incident light contributes to the thickness measurement, and so the signal quality is reduced. At some feature dimension, the reflected signal will be too weak to be useful.

By placing the sensor so that it faces the non-etched surface, the etched feature appears to be a bump in the etched surface of the wafer from the point of view of the sensor. Thus, there is no sidewall interference that inhibits optical techniques now employed and the bottom of the etched feature is easily illuminated regardless of the etched feature's depth.

When the wafer sample consists of multiple layers, the Fabry-Perot interference causes the reflected signal to consist of multiple periodicities in optical frequency. This signal can be analyzed to recover the wafer's material thickness as well as the thicknesses of the other layers. If an intermediate layer also includes an etched feature that would normally be hidden from view by a second layer, the instant invention measures the dimensions of the etched feature by measuring the variation in thickness of the etched layer. If the etched trench has a diameter smaller than the diameter of the illumination spot, then the layer from the etched surface of the wafer to the bottom of the etched trench behaves as a separate layer in the reflectometer signal. Therefore, in this circumstance, the reflectometer simultaneously measures the full thickness of the wafer, the thickness from the bottom of the trench to the non-etched surface, and from the etched surface to the bottom of the etched trench (etched depth).

In view of the above disclosure the primary object of the invention is to provide a system that directly measures from the non-etched surface of a wafer, the depth of a high aspect ratio etched feature, such as a trench, which is located on a wafer.

In addition to the primary object of the invention it is also an object of the invention to provide an invention that:
 can be used for wafers having various dimensions,
 is transportable,
 is relatively easy to learn and operate when compared to similar systems,
 is fast, reliable and relatively maintenance free,
 can be custom configured for a user's specific needs,
 is accurate, repeatable, non-destructive and has a high spatial resolution, and
 is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
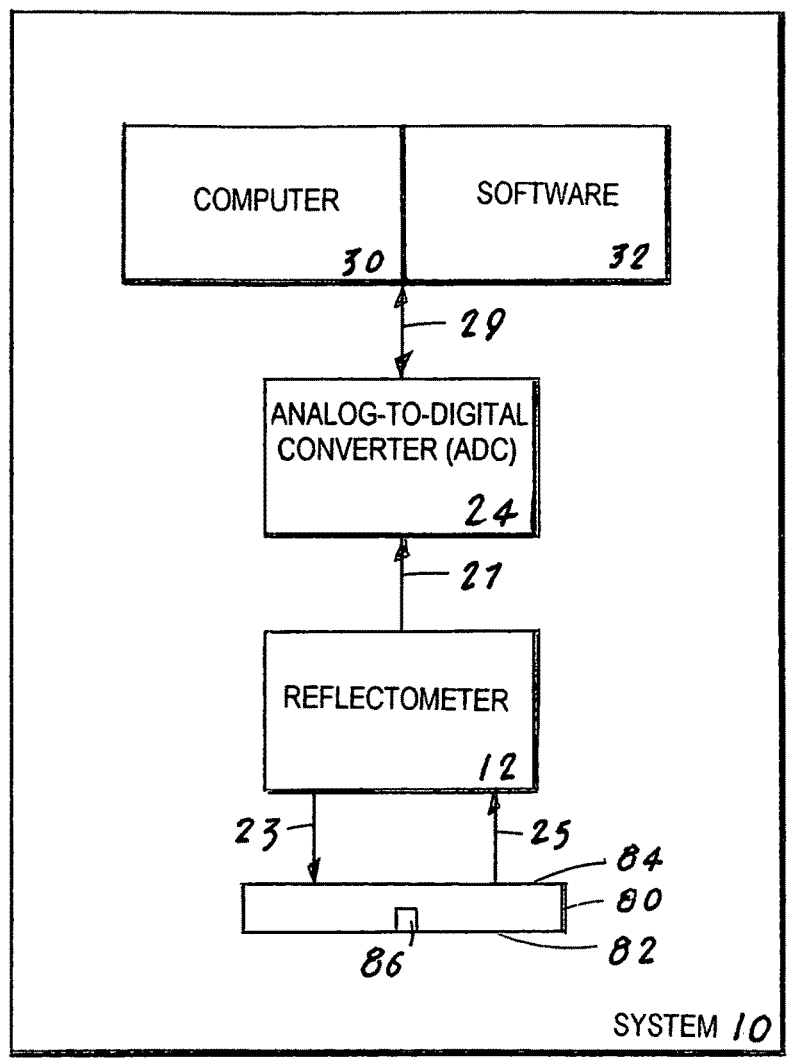
FIG. 1 is a block diagram showing the first embodiment that depicts a basic design of a system for directly measuring the depth of a high aspect ratio etched feature on a wafer.
Figure 2:
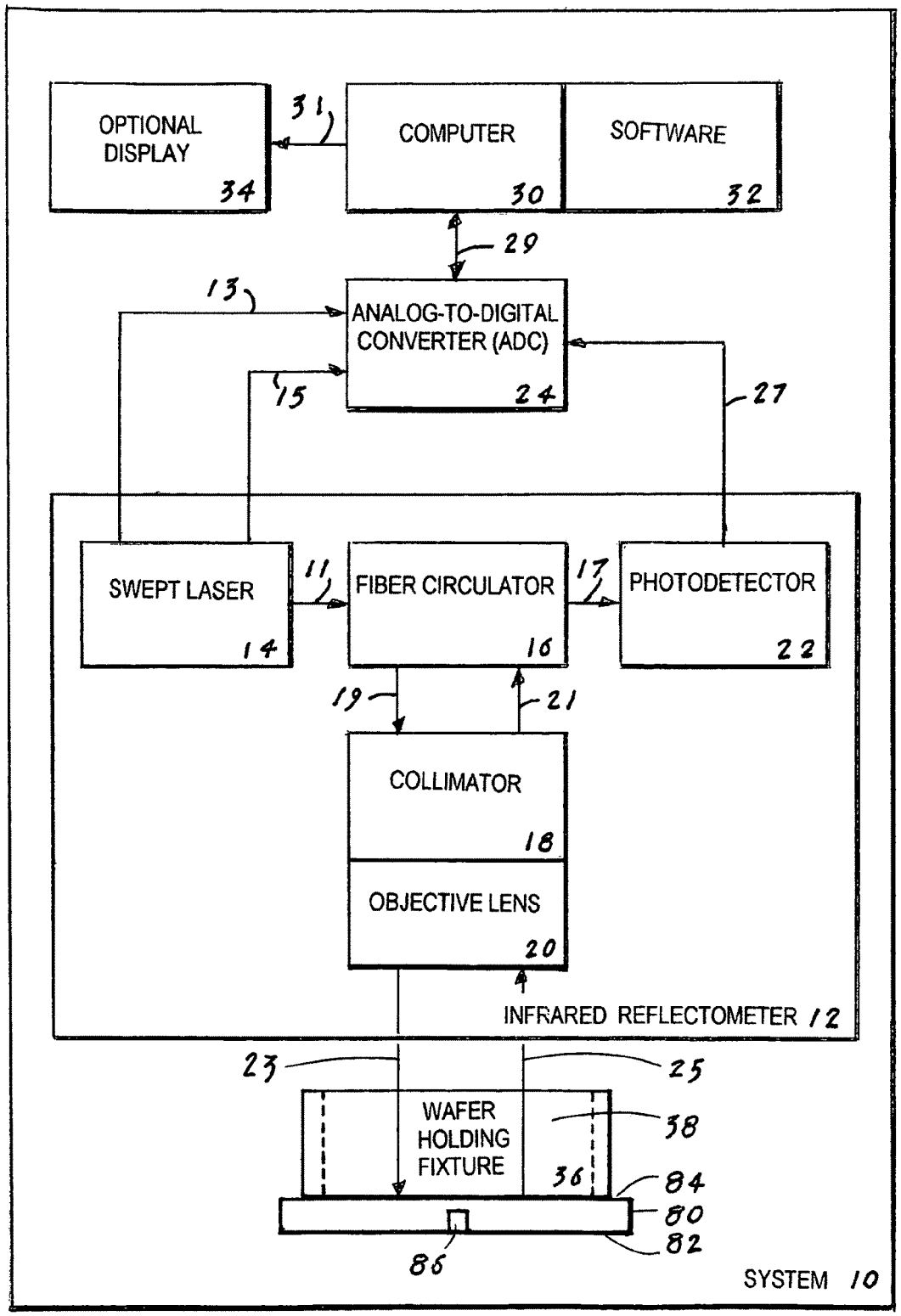
FIG. 2 is a block diagram showing the second embodiment of the system.
Figure 3:
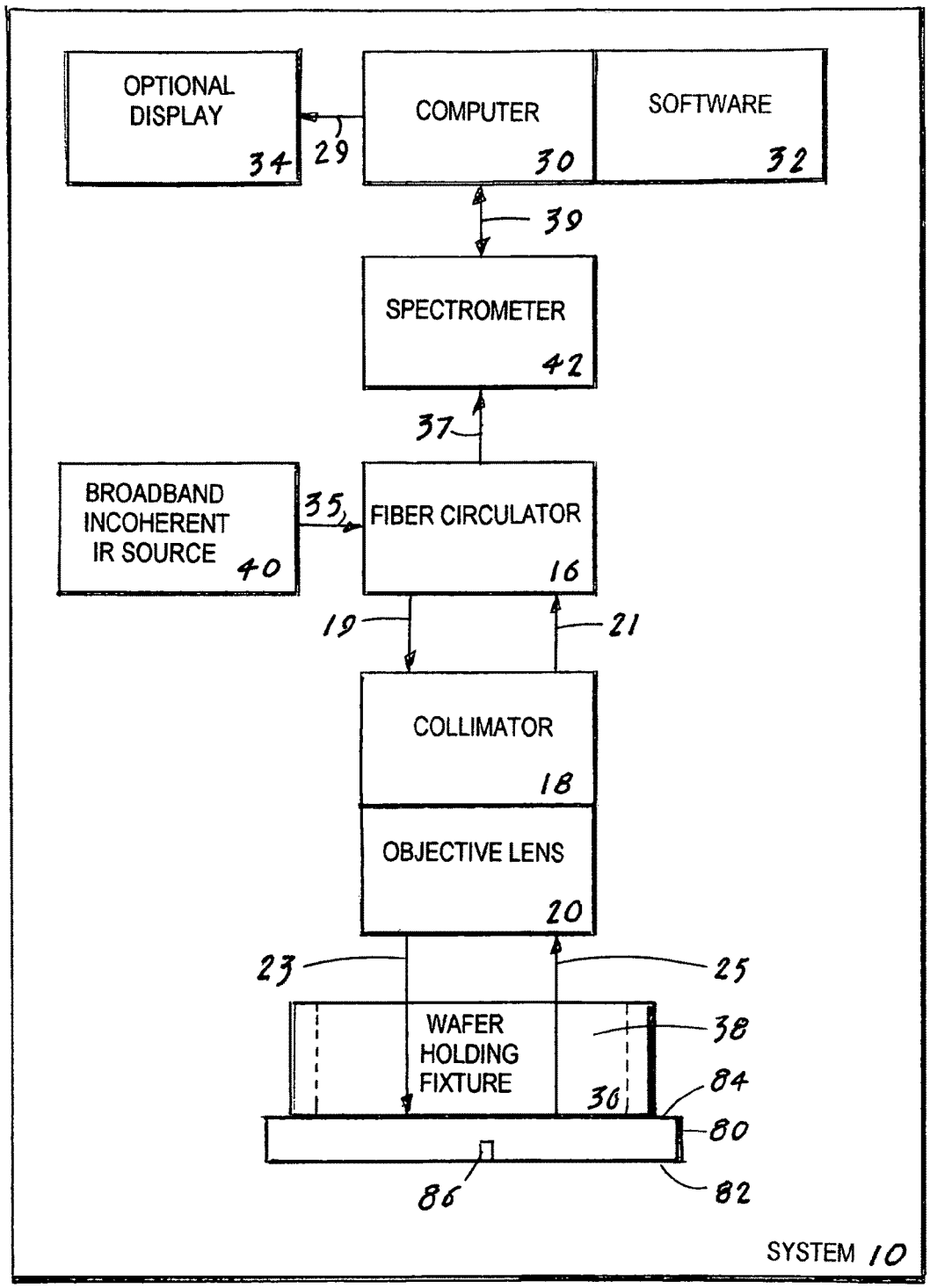
FIG. 3 is a block diagram showing the third embodiment of the system.
Figure 4:
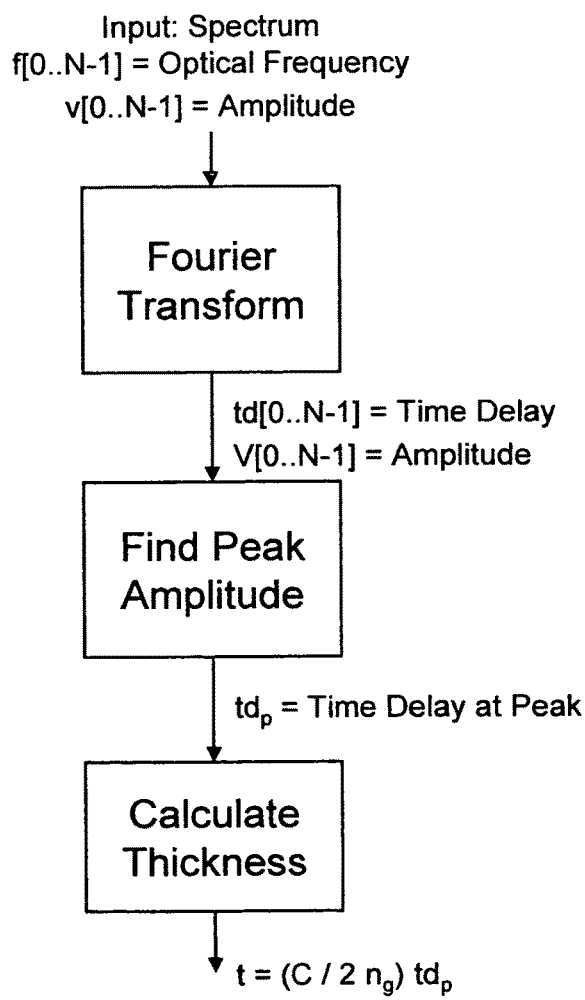
FIG. 4 is a flow diagram of the system software.

The best mode for carrying out the invention of a system that directly measures the depth of a high aspect ratio etched feature located on a wafer is presented in terms of a first basic embodiment, a second embodiment and a third embodiment, as shown respectively in FIGS. 1-3. The computer software 32 that operates the system 10 is illustrated as a flow diagram in FIG. 4. The wafer 80, as also shown in FIGS. 1-3, includes an etched surface 82 and a non-etched surface 84, wherein the etched surface 82 is also referred to as a trench 86.

Figure 5:
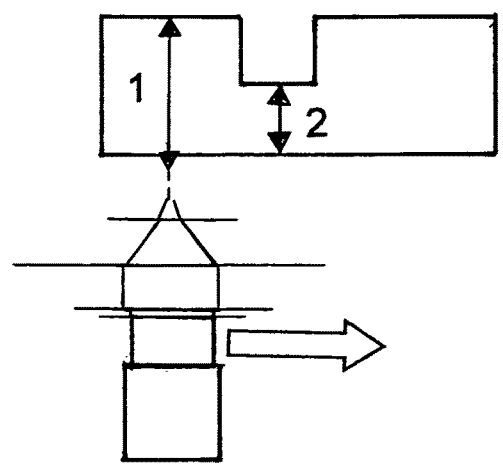
FIG. 5 is a block diagram showing a sequential scanning method.

The first basic embodiment of the system 10, as shown in FIG. 1, is comprised of the following major elements: a reflectometer 12, an analog-to-digital converter (ADC) 24, a computer 30, and software 32. The methods for operating the system 10 are described and shown in FIGS. 5, 6 and 7.

The reflectometer 12, which is preferably comprised of an infrared reflectometer 12, is positioned to face the non-etched surface 84 of the wafer 80. The reflectometer 12 has means for producing a focused incident light 23 that is applied to the non-etched surface 84 of the wafer 80. The reflectometer 12 also has means for receiving and processing a light 25 that is reflected from the non-etched surface 84 of the wafer 80, as shown in FIG. 1. The output of the reflectometer 12 is an analog optical frequency spectrum signal 27 that is applied to the ADC 24, where the analog optical frequency spectrum signal 27 is converted to a corresponding digital data signal 29.

The computer 30, in combination with the software 32, has means for processing the digital data signal 29 applied from the ADC 24 and to display the depth of the high aspect ratio etched surface of the wafer 80. The computer 30 can also produce a display signal 31 that is applied to an optional display 34 (not shown) where the depth of the high aspect ratio etched feature of the wafer 80 can be displayed.

The infrared reflectometer 12 in a preferred configuration is comprised of a swept laser 14, a fiber circulator 16 or a beam splitter 26 (not shown), a collimator 18, an objective lens 20, and a photodetector 22. The swept laser 14, which sweeps through range of wavelengths in time, is connected to the fiber circulator 16 or to the beam splitter 26, either of which is connected to both the collimator 18 and the photodetector 22. The collimator 18 functions in combination with the objective lens 20 which is positioned above the non-etched surface 84 of the wafer 80.

The broadband light source can be comprised of either the swept laser 14, as shown in FIGS. 1 and 2, or a broadband incoherent infrared source 40, as shown in FIG. 3. The broadband incoherent infrared source 40 can be selected from the group consisting of an LED, a halogen light source, a mercury arc lamp or a superluminescent diode (SLED). When the photodetector 22 is used, the light source is comprised of the swept laser 14, as shown in FIG. 2; when a spectrometer 42 is used, the light source is comprised of broadband incoherent infrared source 40, as shown in FIG. 3. In all cases, the broadband light source produces a set of wavelengths that encompass a range From 1260 nm to 1360 nm or 1480 nm or 1620 nm, wherein the wafer 80 is transparent to the wavelengths.

The software 32 is applied the digital data signal 29 from the ADC 24 and performs the following operations:
  a) a Fourier transform,
  b) find peak amplitude, and
  c) calculate thickness.

As in the second and third embodiments, the first embodiment can utilize a wafer holding fixture 36. The fixture 36 has means for being laterally displaced and means for positioning the non-etched surface 84 of the wafer 80 facing the infrared reflectometer 12.

The second embodiment which is the preferred embodiment of the system 10, as shown in FIG. 2, is comprised of the following elements: an infrared reflectometer 12, a swept laser 14, a fiber circulator 16, a collimator 18, an objective lens 20, a photodetector 22, an ADC 24, a computer 30, software 32, a display 34 and a wafer holding fixture 36.

The infrared reflectometer 12 is designed to produce a focused incident light 23, to receive a reflected light 25, and to indicate their ratio. The reflectometer 12 uses a small spot size to illuminate the non-etched surface 84 of the wafer 80. The reflectometer 12 in the second embodiment is comprised of the swept laser 14 which produces a set of wavelengths 11 that are swept in time, a trigger signal 13 and a clock signal 15. The swept wavelengths 11 typically range from 1260 mm to 1360 mm which encompasses a range where the wafer 80 is transparent.

The fiber circulator 16 has a first input that receives the range of wavelengths 11 from the swept laser 14. The fiber circulator has a first light output 19 which directs the light to the collimator 18. The collimator 18 collimates the light which is then focused by the objective lens 20 onto the non-etched surface 84 of the wafer 80. The reflected light 25 from the wafer 80 is composed of reflections from the non-etched surface 84, the etched surface 82, and any other layers that comprise the wafer. The reflected light 25 is collected by the objective lens 20 and returned to the fiber circulator 16 via the collimator 18. The reflected light return 21 applied to the fiber circulator 16 and the first light output 19 from the fiber circulator 16 share the same physical optical fiber. The reflected light 25 is then directed by the second light output 17 from the fiber circulator 16 to the photodetector 22. The photodetector 22, when applied the second light output 17 from the fiber circulator 16, produces an analog optical frequency spectrum signal 27 that is applied the ADC 24.

The ADC 24, which is designed to function as a data acquisition device, has a first input and a second input, that are applied respectively from the swept laser 14, the trigger signal 13 and the clock signal 15, as shown in FIG. 2. The ADC 24 further has a third input that is applied the analog optical frequency spectrum 27 from the photodetector 22, wherein the output of the ADC 24 is a corresponding digital data signal 29.

The computer 30, in combination with the software 32, has means for analyzing the periodicity of the spectrum to produce a thickness measurement and to produce a display signal 31 that portrays on the display 34 the high aspect ratio etched feature of the wafer 80.

The wafer holding fixture 36, as shown in FIG. 3, has an open area 38 that is larger than the etched surface 82 of the wafer 80, a means for being laterally displaced, and a means for placing the non-etched surface 84 of the wafer 80 facing the objective lens 20 located on the infrared reflectometer 12. The wafer 80 is selected from the group consisting of Si, GaAs, GaAlAs, InP, SiC, $SiO_2$ and sapphire.

The third embodiment, as shown in FIG. 3, is comprised of the following elements: a broadband incoherent infrared source (BUS) 40, a fiber circulator 16, a collimator 18, an objective lens 20, a spectrometer 42, a computer 30, software 32, a display 34 and a wafer holding fixture 36.

The broadband incoherent infrared source (BUS) 40 has means for producing an incoherent light 35 that is applied to the first input of the fiber circulator 16. The fiber circulator has a first light output 19 which is directed the light to the collimator 18. The collimator 18 collimates the light which is then focused by the objective lens 20 to produce a focused incident light 23 that is applied to the non-etched surface 84 of the wafer 80. From the wafer 80 is produced a reflected light 25 that is composed of reflections from the non-etched surface 84, the etched surface 82, and any other layers that might comprise the wafer 80. The reflected light 25 is collected by the objective lens 20 and returned to the fiber circulator 16 by means of the light return 21 and the first light output 19 from the fiber circulator 16 share the same physical optical fiber. A light signal 37 is directed from the fiber circulator 16 to the spectrometer 42, as shown in FIG. 3.

The spectrometer 42, which can consist of a grating spectrometer, a Fourier transform infrared spectrometer (FTIR), or other types of spectrometers, is applied the light signal 37 from the fiber circulator 16. From the spectrometer 42 is produced a light spectrum signal 39 that is applied to the computer 30. The computer 30, in combination with the software 32, has means for processing the light spectrum signal 39 and to produce a digital data signal 29. The digital data signal 29 portrays on the display 34 the depth of the high aspect ratio etched feature of the wafer 80.

The wafer holding fixture 36, as shown in FIG. 3, has means for being laterally displaced and means for positioning the non-etched surface 84 of the wafer 80 facing the objective lens 20.

When the width of the etched feature is equal to or greater than the illumination spot size, a sequential scanning method is preferred. To measure the depth of an etched feature with this method, first, measure the thickness of an adjacent area of the wafer 80 that is not etched, as designated by the numeral "1" in FIG. 5; second, measure the thickness of the wafer 80 where it is etched (thickness from the bottom of the etched feature to the non-etched surface 84 of the wafer 80), as designated by the numeral "2" in FIG. 5; and third, subtract the two measurements.

Figure 6:
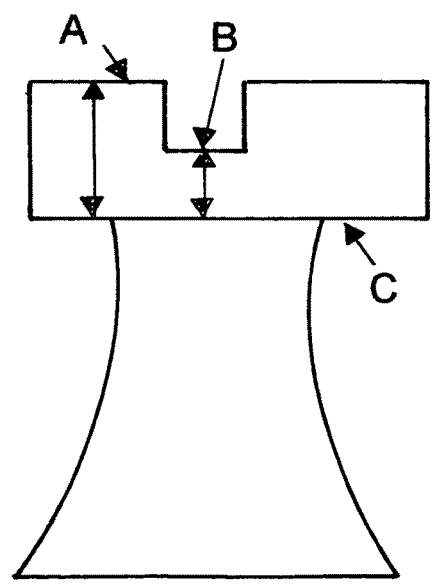
FIG. 6 is a block design showing a direct scanning method.
Figure 7:
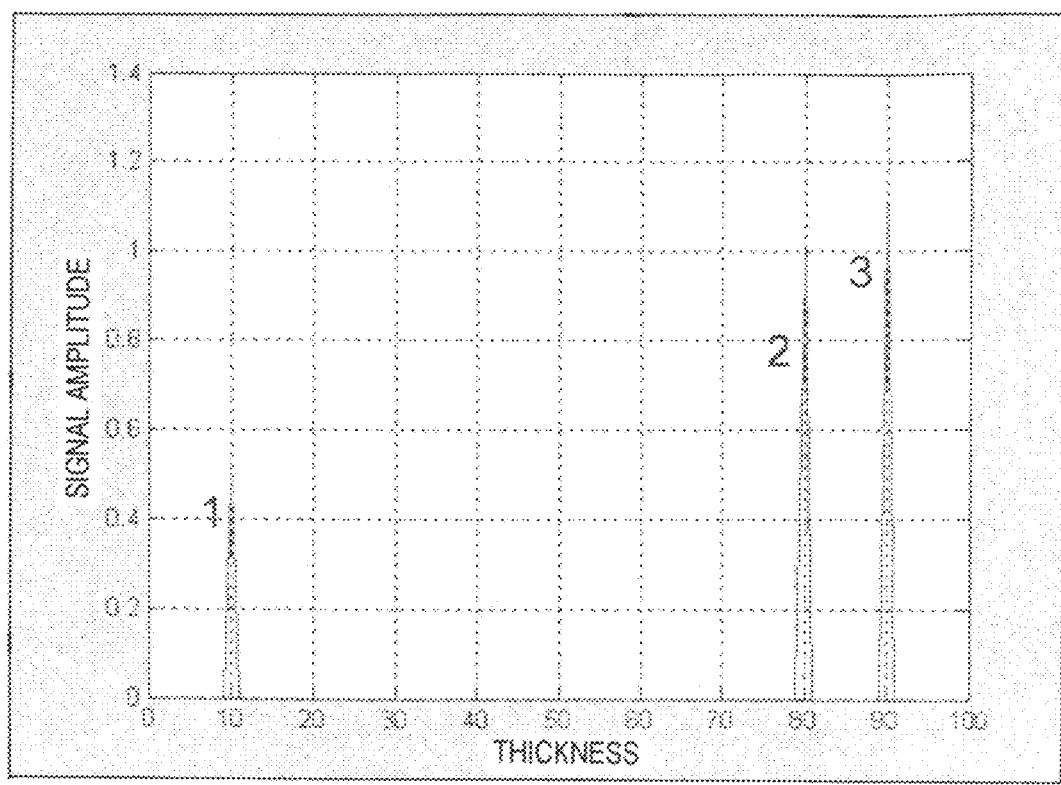
FIG. 7 is a graph depicting the thickness and the signal amplitude for a method wherein the width of the etched feature is smaller than the illumination spot size.

When the width of the etched feature is smaller than the spot size, e.g., the etched feature is a circular hole with a 5 μm diameter and the illumination spot size is 13 μm, then the etched depth can be measured with a direct method. Since the illumination covers the etched feature, as designated by the letter "B" in FIG. 6, and the surrounding wafer surface, as designated by the letter "A" in FIG. 6, light is reflected from both of the surfaces A and B. The reflected light from A and B interferes with light reflected from the non-etched surface of the wafer, as designated by the letter "C" in FIG. 6. An example of the measurement signals is shown in FIG. 7. In this example, Peak #1 in FIG. 7 results from the interference of the light reflected from the bottom of the etched feature, as designated by the letter "B" in FIG. 6, and the top of the etched surface of the wafer 80, as designated "A" in FIG. 6, and so Peak #1 is a direct measurement of the etched depth. Therefore, in one measurement instant, without requiring mechanical scanning or the manipulation of separate measurements, a direct measurement of the etched depth is possible.

The thickness measurement for the method where the width of the etched feature is smaller than the illumination spot size is shown in FIG. 7. Peak 1 corresponds to the interference between the reflections from surfaces A and B of FIG. 6; Peak 2 corresponds to the interference between the reflections from surfaces B and C of FIG. 6; and Peak 3 measures the full wafer thickness from the interference between the reflections from surfaces A and C, as also shown in FIG. 6.

The first method for measuring the depth of a high aspect ratio etched feature on a wafer 80 having an etched surface 82 and a non-etched surface 84 is typically utilized when the width of the etched feature 86 is equal to or greater than the applied illumination spot size. The first method, which is also referred to as a sequential scanning method, is conducted by performing the following steps:
 a) position a reflectometer facing the non-etched surface of the wafer,
 b) measure the thickness of the wafer 80 at a location where it is not etched,
 c) measure the thickness of the etched surface 82 of the wafer 80 at a location where it is etched, and
 d) subtract the two measurements to determine the depth of the etched feature.

The second method for measuring the depth of a high aspect ratio etched feature on a wafer 80 having an etched surface 82 and a non-etched surface 84 is utilized when the width of the etched surface 82 is smaller than the diameter of the applied illuminating spot size. The second method, which is also referred to as the direct method, is conducted by performing the following steps:
 a) position a reflectometer facing the non-etched surface of the wafer,
 b) simultaneously illuminate the etched feature 86, the etched surface 82 adjacent to the etched feature 86, and the non-etched surface 84, and
 c) directly measure the interference between the reflections from the etched surface 82 and the etched feature 86, and
 d) calculate the etch depth directly from the interference recorded in step c).

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. A system for directly measuring the depth of a high aspect ratio etched feature on a wafer having an etched surface and a non-etched surface, said system comprising:
 a) a reflectometer that is positioned to face the non-etched surface of the wafer, wherein said reflectometer having means for producing a focused incident light of multiple optical frequencies that is applied to the non-etched surface of the wafer, and means for receiving and processing a reflected light that is also applied from the non-etched surface of the wafer, wherein said reflectometer produces an output signal representative of the intensity of Fabry Perot interference fringes in the reflected light for each of the multiple optical frequencies,
b) an analog-to-digital converter (ADC) that converts the output signal to a corresponding digital data signal,
c) a computer having means for processing the digital data signal and to display the depth of the high aspect ratio etched feature of the wafer.

2. The system as specified in claim 1 wherein said reflectometer is comprised of an infrared reflectometer having an objective lens that produces a focused spot on the wafer.

3. The system as specified in claim 2 wherein said infrared reflectometer, which functions as a broadband light source, is comprised of:
a) a fiber circulator or a beam splitter,
b) a collimator,
c) an objective lens, and
d) a photodetector, wherein the broadband light source is connected to the fiber circulator or the beam splitter, either of which is connected to both the collimator and the photodetector, wherein the collimator interfaces with the objective lens which is positioned above the non-etched surface of the wafer.

4. The system as specified in claim 3 wherein said broadband light source is comprised of a swept laser or a broadband incoherent light source.

5. The system as specified in claim 4 wherein the broadband incoherent light source is selected from the group consisting of an LED, a halogen light source, a mercury arc lamp and a superluminescent diode.

6. The system as specified in claim 3 further comprising a wafer holding fixture having an opening that is larger than the etched surface of the wafer, means for being laterally displaced, and a means for positioning the non-etched surface facing the infrared reflectometer.

7. The system as specified in claim 1 wherein said light source produces a set of wavelengths that encompass a range wherein the wafer is transparent.

8. The system as specified in claim 1 wherein said computer performs the following operations:
a) a Fourier transform,
b) find peak amplitude, and
c) calculate thickness.

9. A system for directly measuring the depth of a high aspect ratio etched feature on a wafer having an etched surface and a non-etched surface, said system comprising:
a) an infrared reflectometer comprising:
(1) a swept laser having means for producing a wavelength that is swept in time across a range of wavelengths, a trigger signal and a clock signal,
(2) a fiber circulator having a first input that is applied the wavelengths from said swept laser, a second input, a first light output and a second light output,
(3) a collimator that is applied the second light output from said fiber circulator and that produces a collimated light output that is applied to the second input on said fiber circulator,
(4) an objective lens that interfaces with the collimator and that is positioned to face the non-etched surface of the wafer, wherein from the lens is emitted a focused incident light that is applied to the non-etched surface of the wafer, wherefrom the wafer is emitted a reflected light that is applied to said objective lens,
(5) a photodetector that is applied the first light output from said fiber circulator and that produces an analog spectrum optical frequency signal indicative of the intensity of Fabry Perot interface fringes for each wavelength,
b) an analog to digital converter (ADC) that functions as a data acquisition device, said ADC having a first input and a second input that are applied respectively to the trigger signal and the clock signal from the swept laser, wherein said ADC further having a third input that is applied to the analog spectrum optical frequency signal that is applied from the photodetector, wherein said ADC produces a corresponding digital data signal, representing Fabry Perot intensity values at each wavelength,
c) a computer having means for analyzing the periodicity of the spectrum to produce a thickness measurement and to produce a display signal that portrays on a display the depth of the high aspect ratio etched feature on the wafer, and
d) a wafer holding fixture having means for being laterally displaced and means for positioning the non-etched surface of the wafer facing the objective lens on said infrared reflectometer.

10. The system as specified in claim 9 wherein the swept wavelengths range from 1260 nm to 1360 nm or 1480 nm to 1620 nm which encompasses a range wherein the wafer is transparent.

11. The system as specified in claim 9 wherein said computer performs the following operations:
a) a Fourier transform,
b) find peak amplitude, and
c) calculate thickness.

12. A system for directly measuring the depth of a high aspect ratio etched feature on a wafer having an etched surface and a non-etched surface, said system comprising:
a) an infrared reflectometer comprising:
(1) a broadband incoherent infrared source (BIIS) having means for producing an incoherent light source producing multiple optical frequencies,
(2) a fiber circulator having a first input that is applied the incoherent light signal from said BIIS, a second input, a first light output and a second light output,
b) a collimator that is applied the second light output from said fiber circulator and that produces a collimated light output that is applied to the second input on said fiber circulator,
c) an objective lens that interfaces with the collimator and that is positioned to face the non-etched surface of the wafer, wherein from the lens is emitted a focused incident light that is applied to the non-etched surface of the wafer, wherefrom the wafer is emitted a reflected light that is applied to said objective lens,
d) a spectrometer that is applied the light signal from said fiber circulator and that produces a light distribution signal indicative of Fabry Perot interference fringes therein for each of the multiple optical frequencies,
e) a computer, in combination with software, having means for processing the light distribution signal applied from said spectrometer and to produce a digital data signal that portrays on a display the depth of the high aspect ratio etched feature on the wafer, and
f) a wafer holding fixture having means for being laterally displaced and means for positioning the non-etched surface of the wafer facing the objective lens.

13. An optical measurement system for determining the depth of one or more etched features on a wafer having an etched surface and a non-etched surface, the system comprising:

a) a data acquisition system having a broadband light source producing multiple optical frequencies of light, a light intensity detection system, an optical system adapted to receive light from the source, to direct the light received from the source toward the non-etched surface of the wafer, to receive from the wafer a portion of the light directed toward the wafer, and to direct the portion of light received from the wafer toward the light intensity detection system so as to detect the intensity of Fabry Perot interference fringes therein wherein the light intensity detection system produces an output signal representative of the intensity of light for each optical frequency; and b) a data processing system adapted to receive the output signal from the light intensity detection system and produce a signal representative of the depth of one or more features of the etched surface of the wafer.

14. The measurement system of claim 13, wherein the broadband light source produces multiple frequencies of light simultaneously.

15. The measurement system of claim 14, wherein the light intensity detection system comprises a spectrometer.

16. The measurement system of claim 15, wherein the data processing system comprises a programmed computer.

17. The measurement system of claim 16, wherein the computer is programmed to accept data from the spectrometer representative of intensity for a given optical frequency, perform a frequency-to-time Fourier transform, find the peak amplitude of the time as representative of time delay, and calculate wafer thickness based on the speed of light in a vacuum, the time delay and the index of refraction of the wafer material.

18. The measurement system of claim 17, wherein the optical system comprises an objective lens for focusing light at the wafer and receiving light reflected from the wafer, a fiber circulator for guiding light from the source to the objective lens and guiding light from the objective lens to the light intensity detection system, and a collimator disposed between the fiber circulator and the objective lens.

19. The measurement system of claim 18, wherein the data processing system, is adapted to produce a signal representative of the distance from the etched surface to the bottom of a feature etched therein by subtracting the thickness of the wafer at the etched feature from the thickness of the wafer at another location.

20. The measurement system of claim 19, wherein the thickness of the wafer at the etched feature is measured separately from the thickness of the wafer at another location.

21. The measurement system of claim 19, wherein the thickness of the wafer at the etched feature and the thickness of the wafer at another location are measured simultaneously.

22. The measurement system of claim 15, wherein the optical system comprises an objective lens for focusing light at the wafer and receiving light reflected from the wafer, a fiber circulator for guiding light from the source to the to the objective and guiding light from the objective lens to the detection system, and a collimator disposed between the fiber circulator and the objective lens.

23. The system of claim 13, wherein the objective lens is adapted to focus the light from the source to a desired spot size.

24. The measurement system of claim 13, wherein the broadband light source light produces multiple wavelengths over time.

25. The measurement system of claim 24, wherein the broadband light source is a swept wavelength infrared laser.

26. The measurement system of claim 25, wherein the light intensity detection system comprises a photo detector and an analog-to-digital converter synchronized in time with the swept wavelength laser.

27. The measurement system of claim 26, wherein the data processing system comprises a programmed computer.

28. The measurement system of claim 27, wherein the computer is programmed to accept data from the light intensity detection system representative of light intensity for a given optical frequency, perform a frequency-to-time Fourier transform, find the peak amplitude of the time as representative of time delay, and calculate wafer thickness based on the speed of light in a vacuum, the time delay and the index of refraction of the wafer material.

29. The measurement system of claim 28, wherein the optical system comprises an objective lens for focusing light at the wafer and receiving light reflected from the wafer, a fiber circulator for guiding light from the source to the to the objective and guiding light from the objective lens to the photo detector, and a collimator disposed between the fiber circulator and the objective lens.

30. The measurement system of claim 29, wherein the data processing system is adapted to produce a signal representative of the distance from the etched surface to the bottom of a feature etched therein by subtracting the thickness of the wafer at the etched feature from the thickness of the wafer at another location.

31. The measurement system of claim 30, wherein the thickness of the wafer at the etched feature is measured separately from the thickness of the wafer at another location.

32. The measurement system of claim 30, wherein the thickness of the wafer at the etched feature and the thickness of the wafer at another location are measured simultaneously.

33. The measurement system of claim 13, further comprising a wafer holding fixture adapted to position the non-etched surface of the wafer facing the optical system.

* * * * *

UNITED STATES PATENT AND TRADEMARK OFFICE
CERTIFICATE OF CORRECTION

| | | |
|---|---|---|
| PATENT NO. | : 8,649,016 B2 | Page 1 of 1 |
| APPLICATION NO. | : 13/134716 | |
| DATED | : February 11, 2014 | |
| INVENTOR(S) | : David S. Marx et al. | |

It is certified that error appears in the above-identified patent and that said Letters Patent is hereby corrected as shown below:

In the Specification

Column 1, line 61, delete "fixture" and insert in place thereof --future--.

Column 2, line 64, delete "(501)" and insert in place thereof --(SOI)--.

Column 4, line 15, delete "Reflectometery" and insert in place thereof --Reflectometry--.

Column 4, line 66, delete "Fabrbry" and insert in place thereof --Fabry--.

Column 8, line 13, delete "From" and insert in place thereof --from--.

In the Claims

Claim 9, Column 11, line 49, delete "reflectrometer" and insert in place thereof --reflectometer--.

Claim 22, Column 14, line 4, delete "to the to the" and insert in place thereof --to the--.

Claim 23, Column 14, line 8, delete "system" and insert in place thereof --measurement system--.

Claim 29, Column 14, line 33, delete "to the to the" and insert in place thereof --to the--.

Signed and Sealed this
Third Day of June, 2014

Michelle K. Lee
*Deputy Director of the United States Patent and Trademark Office*